US 12,109,667 B2

(12) United States Patent
Watanabe (10) Patent No.: US 12,109,667 B2
(45) Date of Patent: Oct. 8, 2024

(54) SPINDLE UNIT AND PROCESSING APPARATUS

(71) Applicant: DISCO CORPORATION, Tokyo (JP)

(72) Inventor: Hiroyuki Watanabe, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 515 days.

(21) Appl. No.: 17/398,425

(22) Filed: Aug. 10, 2021

(65) Prior Publication Data

US 2022/0063055 A1 Mar. 3, 2022

(30) Foreign Application Priority Data

Aug. 27, 2020 (JP) .................. 2020-143348

(51) Int. Cl.
*B24B 47/12* (2006.01)
*B24B 49/08* (2006.01)
*F16C 17/04* (2006.01)

(52) U.S. Cl.
CPC .............. *B24B 47/12* (2013.01); *B24B 49/08* (2013.01); *F16C 17/04* (2013.01)

(58) Field of Classification Search
CPC ......... B24B 7/228; B24B 47/12; B24B 49/08; B24B 41/04; B24B 41/042; B24B 41/047; B24B 47/10; B24B 47/14; B24B 47/16; B24B 47/20; B24B 47/22; B24B 37/07; B24B 37/10; B24B 37/005; B24B 37/04; B24B 47/06; B23Q 5/06; B23Q 5/043; F16C 17/04; F16C 32/06; F16C 32/0603
USPC .......................................................... 451/5
See application file for complete search history.

(56) References Cited

U.S. PATENT DOCUMENTS

| 4,869,626 A * | 9/1989 | Kosmowski .......... B23B 31/142 384/111 |
| 2005/0176347 A1* | 8/2005 | Tang ....................... B24B 7/228 451/5 |
| 2009/0203299 A1* | 8/2009 | Kashiwa ................. B24B 7/228 451/285 |

(Continued)

FOREIGN PATENT DOCUMENTS

| JP | 11132232 A | 5/1999 |
| JP | 2008049445 A | 3/2008 |

(Continued)

OTHER PUBLICATIONS

WO-2007079978-A1 espacenet (Year: 2024).*
JP-2010064201-A espacenet (Year: 2024).*

*Primary Examiner* — Brian D Keller
*Assistant Examiner* — Tim Brady
(74) *Attorney, Agent, or Firm* — GREER BURNS & CRAIN, LTD.

(57) ABSTRACT

A spindle unit includes a spindle having a processing tool fitted to a distal end of the spindle; and a spindle housing having a thrust bearing and a radial bearing configured to support the spindle by air in a rotatable and noncontact manner, the thrust bearing including an air supply portion configured to supply air to a gap between an outer surface of the spindle, the outer surface being in a direction orthogonal to an axial direction of the spindle, and an inner surface of the spindle housing, and an adjusting unit capable of adjusting a distance of the gap in a direction perpendicular to the outer surface of the spindle.

12 Claims, 5 Drawing Sheets

(56) References Cited

U.S. PATENT DOCUMENTS

| 2017/0234365 | A1* | 8/2017 | Oshida | F16C 32/0692 |
| | | | | 451/259 |
| 2020/0238471 | A1* | 7/2020 | Barkam | B24B 37/26 |
| 2021/0220965 | A1* | 7/2021 | Hwang | B24B 57/02 |
| 2022/0314382 | A1* | 10/2022 | Laporte | B23Q 1/70 |

FOREIGN PATENT DOCUMENTS

| JP | 2010064201 A | * | 3/2010 | |
| WO | WO-2007079978 A1 | * | 7/2007 | B24B 27/0076 |

* cited by examiner

SPINDLE UNIT AND PROCESSING APPARATUS

BACKGROUND OF THE INVENTION

Field of the Invention

The present invention relates to a spindle unit and a processing apparatus.

Description of the Related Art

A grinding apparatus that grinds a wafer held on a chuck table has a spindle unit including a spindle. In this grinding apparatus, a grinding wheel having grinding stones arranged thereon in an annular shape is fitted to a distal end of the spindle. The grinding stones rotated by rotation of the spindle grind the wafer.

As disclosed in Japanese Patent Laid-Open No. Hei 11-132232, the spindle unit includes a spindle housing that surrounds an outer circumferential surface of the spindle with a gap formed therebetween and an air supply portion that supplies air to the gap. An air bearing is formed by filling the gap with air and pressurizing the air.

In addition, as disclosed in Japanese Patent Laid-Open No. 2008-049445, the spindle can measure a load applied to the grinding stones by measuring the pressure of the air in the gap.

SUMMARY OF THE INVENTION

In the spindle unit as described above, a load is applied in a direction of inclining the spindle by grinding processing that grinds the wafer while pressing the grinding stones of the grinding wheel fitted to the distal end of the spindle against the wafer, and the gap is narrowed to suppress inclination of the spindle due to the load. That is, a high load resistance (high rigidity) air bearing that resists a grinding load such that the spindle is not inclined when the grinding stones receive the load is formed by increasing the pressure of the air supplied to the narrow gap.

However, because of the narrow gap, at an initial start of the apparatus, the housing or the spindle may be thermally deformed by the supply of the air for forming the air bearing, passage of cooling water, or the like. In this case, a contact part in which the spindle and the housing come into contact with each other is generated, and when the spindle is rotated, the contact part may be scratched, projections and depressions may be formed thereon, and the spindle may not rotate.

It is accordingly an object of the present invention to provide a spindle unit having an air bearing that allows a spindle to rotate continuously even in conditions in which thermal deformation is likely to occur, and is excellent also in resistance to a load.

In accordance with an aspect of the present invention, there is provided a spindle unit including a spindle having a processing tool fitted to a distal end portion of the spindle; and a spindle housing having a thrust bearing and a radial bearing configured to support the spindle by air in a rotatable and noncontact manner, the thrust bearing including an air supply portion configured to supply air to a gap between an outer surface of the spindle, the outer surface being in a direction orthogonal to an axial direction of the spindle, and an inner surface of the spindle housing, and an adjusting unit capable of adjusting a distance of the gap in a direction perpendicular to the outer surface of the spindle.

Preferably, the adjusting unit has a piezoelectric actuator disposed in the spindle and configured to move the outer surface of the spindle forming the thrust bearing, in the axial direction of the spindle. In addition, preferably, the adjusting unit has a piezoelectric actuator disposed in the spindle housing and configured to move the inner surface of the spindle housing forming the thrust bearing, in the axial direction of the spindle.

In accordance with another aspect of the present invention, there is provided a processing apparatus for processing a workpiece by a processing tool, the processing apparatus including a spindle unit including a spindle having the processing tool fitted to a distal end portion of the spindle and a spindle housing having a thrust bearing and a radial bearing configured to support the spindle by air in a rotatable and noncontact manner; a holding unit configured to hold the workpiece; a pressure measuring unit configured to measure pressure of air; and a voltage control unit configured to control a voltage of direct-current power, the thrust bearing including an air supply portion configured to supply air to a gap between an outer surface of the spindle, the outer surface being in a direction orthogonal to an axial direction of the spindle, and an inner surface of the spindle housing, and an adjusting unit including a piezoelectric actuator capable of adjusting a distance of the gap in a direction perpendicular to the outer surface of the spindle, the pressure measuring unit measuring the pressure of the air in the gap in which the thrust bearing is formed, the voltage control unit controlling the voltage of the direct-current power supplied to the piezoelectric actuator, to realize a distance of the gap such that a pressure value measured by the pressure measuring unit becomes a value set in advance.

Preferably, the adjusting unit has the piezoelectric actuator disposed in the spindle and configured to move the outer surface of the spindle forming the thrust bearing, in the axial direction of the spindle. In addition, preferably, the adjusting unit has the piezoelectric actuator disposed in the spindle housing and configured to move the inner surface of the spindle housing forming the thrust bearing, in the axial direction of the spindle.

In the spindle unit according to each aspect of the present invention, the adjusting unit can adjust the distance of the gap (thrust gap) between the outer surface of the spindle, the outer surface being in the direction orthogonal to the axial direction of the spindle, and the inner surface of the spindle housing. Hence, during an idle time before the temperature of the spindle is stabilized, for example, the thrust gap can be widened. It is thus possible to suppress the occurrence of a situation in which the spindle thermally deformed and the spindle housing come into contact with each other during the idle time. Hence, the spindle can be rotated continuously.

In addition, in the spindle unit, the adjusting unit can narrow the thrust gap such that the thrust gap has a normal distance at a time of grinding processing. Hence, a high load resistance (high rigidity) thrust bearing can be realized.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
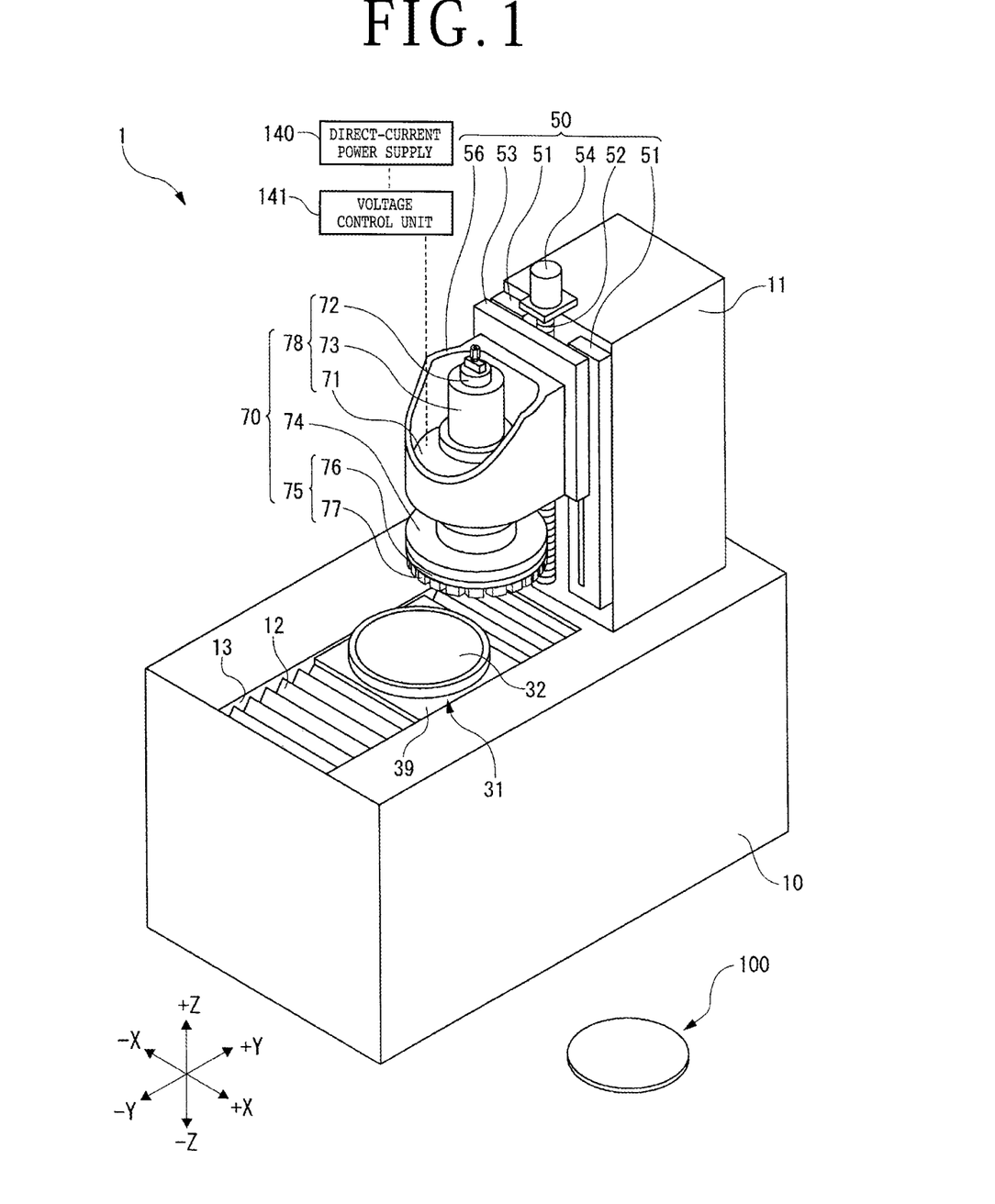
FIG. 1 is a perspective view illustrating a configuration of a grinding apparatus.

An embodiment of the present invention will hereinafter be described with reference to the accompanying drawings. As illustrated in FIG. 1, a grinding apparatus 1 according to the present embodiment is an example of a processing apparatus, and is an apparatus for grinding a wafer 100 as a workpiece. The wafer 100 is, for example, a semiconductor wafer.

The grinding apparatus 1 includes a rectangular parallelepipedic base 10 and a column 11 extending upward.

An opening portion 13 is provided on the upper surface side of the base 10. A chuck table 31 as a holding unit is disposed in the opening portion 13. The chuck table 31 has a holding surface 32 that holds the wafer 100.

The holding surface 32 of the chuck table 31 is formed of a porous material. The holding surface 32 of the chuck table 31 is made to communicate with a suction source (not illustrated), and thereby holds the wafer 100 under suction. That is, the chuck table 31 holds the wafer 100 by the holding surface 32.

In addition, an unillustrated supporting member that is provided below the chuck table 31 can rotate the chuck table 31 about a table central axis passing through the center of the holding surface 32 and extending in a Z-axis direction in a state in which the chuck table 31 holds the wafer 100 by the holding surface 32. Hence, the wafer 100 is held by the holding surface 32, and is rotated, with the center of the holding surface 32 as a rotational axis.

A cover plate 39 that is moved along a Y-axis direction together with the chuck table 31 is provided to the periphery of the chuck table 31. In addition, a bellows cover 12 that expands and contracts in the Y-axis direction is coupled to the cover plate 39. An unillustrated Y-axis direction moving mechanism is disposed below the chuck table 31. The Y-axis direction moving mechanism moves the chuck table 31 along the Y-axis direction.

In the present embodiment, broadly speaking, the chuck table 31 is moved along the Y-axis direction by the Y-axis direction moving mechanism between a front (−Y direction side) mounting position for mounting the wafer 100 onto the holding surface 32 and a rear (+Y direction side) grinding position at which the wafer 100 is ground.

In addition, as illustrated in FIG. 1, the column 11 is erected rearward (+Y direction side) on the base 10. A grinding unit 70 for grinding the wafer 100 as well as a grinding feed mechanism 50 is provided to the front surface of the column 11.

The grinding feed mechanism 50 moves the chuck table 31 and the grinding unit 70 relative to each other in the Z-axis direction (grinding feed direction) perpendicular to the holding surface 32. In the present embodiment, the grinding feed mechanism 50 is configured to move the grinding unit 70 in the Z-axis direction with respect to the chuck table 31.

The grinding feed mechanism 50 includes a pair of Z-axis guide rails 51 parallel with the Z-axis direction, a Z-axis moving table 53 that slides on the Z-axis guide rails 51, a Z-axis ball screw 52 parallel with the Z-axis guide rails 51, a Z-axis motor 54, and a supporting case 56 attached to the front surface (top surface) of the Z-axis moving table 53. The supporting case 56 supports the grinding unit 70.

The Z-axis moving table 53 is installed so as to be slidable on the Z-axis guide rails 51. An unillustrated nut portion is fixed to the rear surface side (undersurface side) of the Z-axis moving table 53. The Z-axis ball screw 52 is screwed into the nut portion. The Z-axis motor 54 is coupled to one end portion of the Z-axis ball screw 52.

In the grinding feed mechanism 50, the Z-axis motor 54 rotates the Z-axis ball screw 52, and the Z-axis moving table 53 thereby moves in the Z-axis direction along the Z-axis guide rails 51. Thus, the supporting case 56 attached to the Z-axis moving table 53 and the grinding unit 70 supported by the supporting case 56 also move in the Z-axis direction together with the Z-axis moving table 53.

The grinding unit 70 has a spindle unit 78 including a spindle housing 71, a spindle 72, and a rotating motor 73. The spindle unit 78 is fixed to the supporting case 56.

The spindle housing 71 is held by the supporting case 56 so as to extend in the Z-axis direction. The spindle 72 extends in the Z-axis direction so as to be orthogonal to the holding surface 32 of the chuck table 31, and is rotatably supported by the spindle housing 71. The rotating motor 73 is coupled to the upper end side of the spindle 72. The rotating motor 73 rotates the spindle 72 about a rotational axis extending in the Z-axis direction.

The grinding unit 70 further includes a wheel mount 74 attached to a lower end portion of the spindle 72 and a grinding wheel 75 supported by the wheel mount 74.

The wheel mount 74 is formed in a disk shape, and is fixed to the lower end portion (distal end portion) of the spindle 72. The wheel mount 74 supports the grinding wheel 75.

The grinding wheel 75 is formed in such a manner that the grinding wheel 75 has substantially the same outside diameter as the outside diameter of the wheel mount 74. The grinding wheel 75 includes an annular wheel base (annular base) 76 formed of a metallic material. Grinding stones 77 as an example of a processing tool are fixed to the lower surface of the wheel base 76 over the entire circumference of the wheel base 76.

The grinding stones 77 are formed in an annular shape. The grinding stones 77 are rotated by the rotating motor 73 via the spindle 72, the wheel mount 74, and the wheel base 76 about a rotational axis passing through the center of the grinding stones 77 and extending in the Z-axis direction. The grinding stones 77 thereby grind the wafer 100 held by the chuck table 31 disposed at the grinding position.

Thus, in the grinding apparatus 1, the grinding stones 77 are fitted to a distal end of the spindle 72 via the wheel mount 74 and the wheel base 76. In the spindle unit 78, the spindle 72 having the grinding stones 77 fitted to the distal end thereof is rotatably supported. The grinding apparatus 1 rotates such a spindle 72, and processes the wafer 100 as a workpiece by the grinding stones 77.

The spindle unit 78 according to the present embodiment will next be described in more detail.

Figure 2:
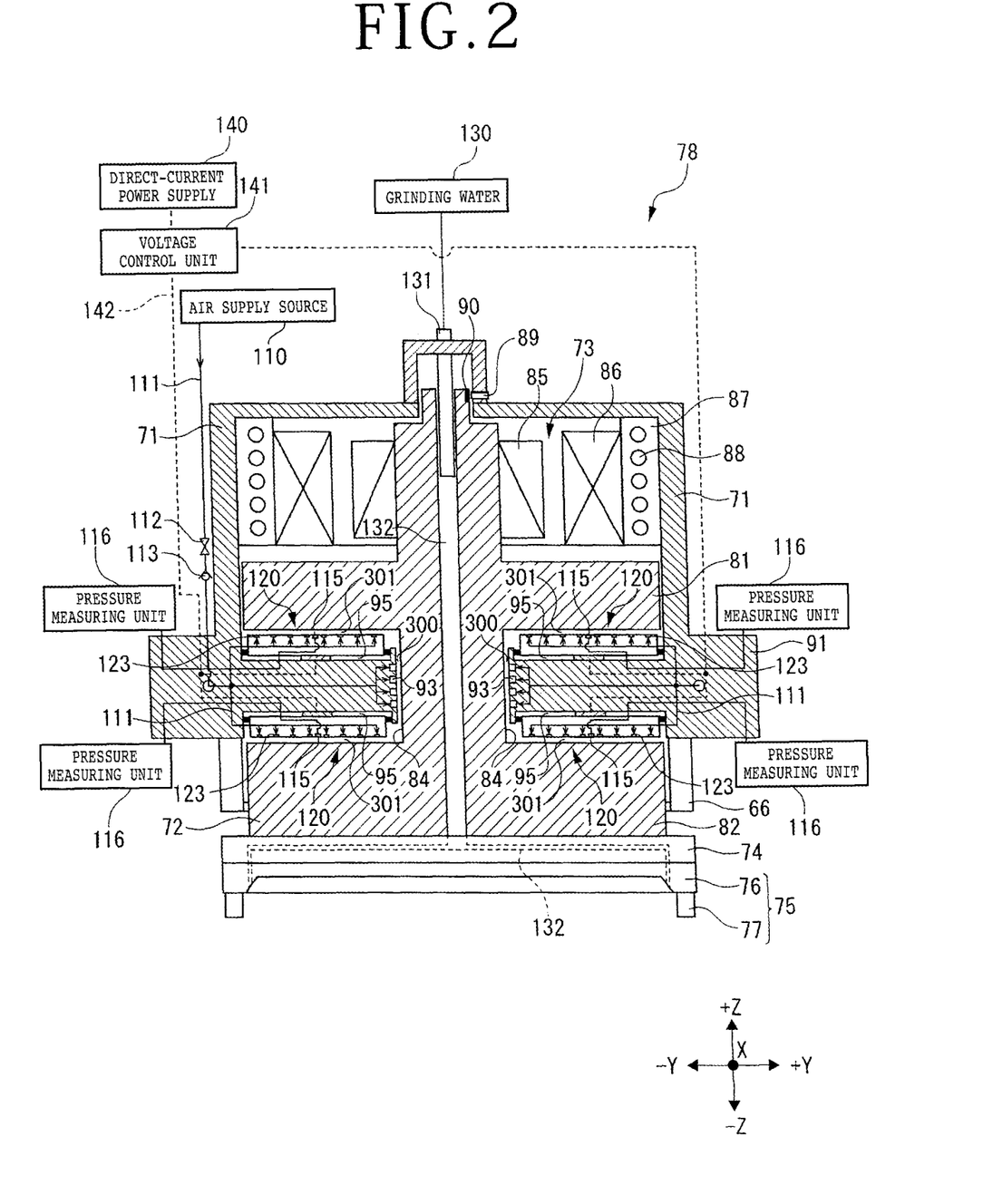
FIG. 2 is a view illustrating a configuration of a spindle unit.

As illustrated in FIG. 2, the spindle unit 78 includes the spindle 72 in an upright posture, the spindle housing 71 that covers the spindle 72 and supports the spindle 72, a spindle cover 66 that covers a lower end part of the spindle 72, and the rotating motor 73 that rotationally drives the spindle 72.

The spindle 72 extends in the Z-axis direction. A large-diameter first disk portion 81 is formed as an intermediate part of the spindle 72. In addition, a large-diameter second disk portion 82 is formed as a lower end part of the spindle 72.

The rotating motor 73 is coupled to an upper end of the spindle 72. The rotating motor 73 includes a rotor 85 provided to an upper end part of the spindle 72 and a stator 86. When a predetermined voltage is applied to the stator 86, the rotor 85 rotates, and thus the spindle 72 rotates about an axis thereof.

In addition, the stator 86 is provided to the inner circumferential surface of the spindle housing 71 via a cooling jacket 87. A large number of cooling water passages 88 are formed in the cooling jacket 87. The cooling water passages 88 cool the rotating motor 73.

A rotation detecting sensor 89 is provided in the vicinity of the upper end of the spindle 72 in the spindle housing 71. The rotation detecting sensor 89 is provided so as to be opposable to a detection target portion 90 attached to the upper end of the spindle 72. The rotation detecting sensor 89 is configured to detect rotation of the spindle 72 by detecting rotational movement of the detection target portion 90.

The wheel mount 74 described above is coupled to the distal end (lower end) of the spindle 72. The wheel mount 74 is fitted with the grinding wheel 75 including the grinding stones 77.

A grinding water introduction passage 131 made to communicate with a grinding water source 130 is attached to the upper end of the spindle 72. In addition, the grinding water introduction passage 131 is made to communicate with a grinding water passage 132 provided in the spindle 72, the wheel mount 74, and the wheel base 76. Such a structure allows grinding water from the grinding water source 130 to be supplied to the grinding stones 77 via the grinding water introduction passage 131 and the grinding water passage 132.

The spindle housing 71 is configured to surround the outer surface of the spindle 72 and to support the spindle 72 in a rotatable manner by air bearings.

The spindle housing 71 has an annular portion 91 as a lower end part of the spindle housing 71. The annular portion 91 is provided to the spindle housing 71 such that the annular portion 91 is inserted between the first disk portion 81 and the second disk portion 82 of the spindle 72 and slight gaps are formed between the first disk portion 81 and the annular portion 91, and the second disk portion 82 and the annular portion 91.

In addition, the spindle housing 71 has a plurality of radial side air jetting ports 93 that are made to communicate with an air supply passage 111 connected to an air supply source 110 and constitute a radial bearing.

The air supply passage 111 is formed so as to extend from the outside of the spindle unit 78 into the spindle housing 71 including the annular portion 91. The air supply passage 111 has an opening and closing valve 112 and a check valve 113.

The radial side air jetting ports 93 are provided in the annular portion 91 so as to be opposed to a radial side surface 84 extending between the first disk portion 81 and the second disk portion 82 in the spindle 72. The radial side air jetting ports 93 are connected to the air supply passage 111.

The radial side air jetting ports 93 are opened to a radial gap 300 as a gap between the radial side surface 84 of the spindle 72 and the annular portion 91 of the spindle housing 71. The radial side air jetting ports 93 jet high-pressure air to the radial gap 300 in a radial direction. The radial bearing that supports the spindle 72 by air in a rotatable and noncontact manner is thereby formed in the radial gap 300 between the spindle housing 71 and the spindle 72.

In addition, the spindle housing 71 has a plurality of adjusting units 120 constituting a thrust bearing.

The adjusting units 120 are provided in thrust recessed portions 95 of the spindle housing 71. The thrust recessed portions 95 and the adjusting units 120 are formed in the annular portion 91 of the spindle housing 71 so as to be opposed to the first disk portion 81 and the second disk portion 82 of the spindle 72.

Figure 3:
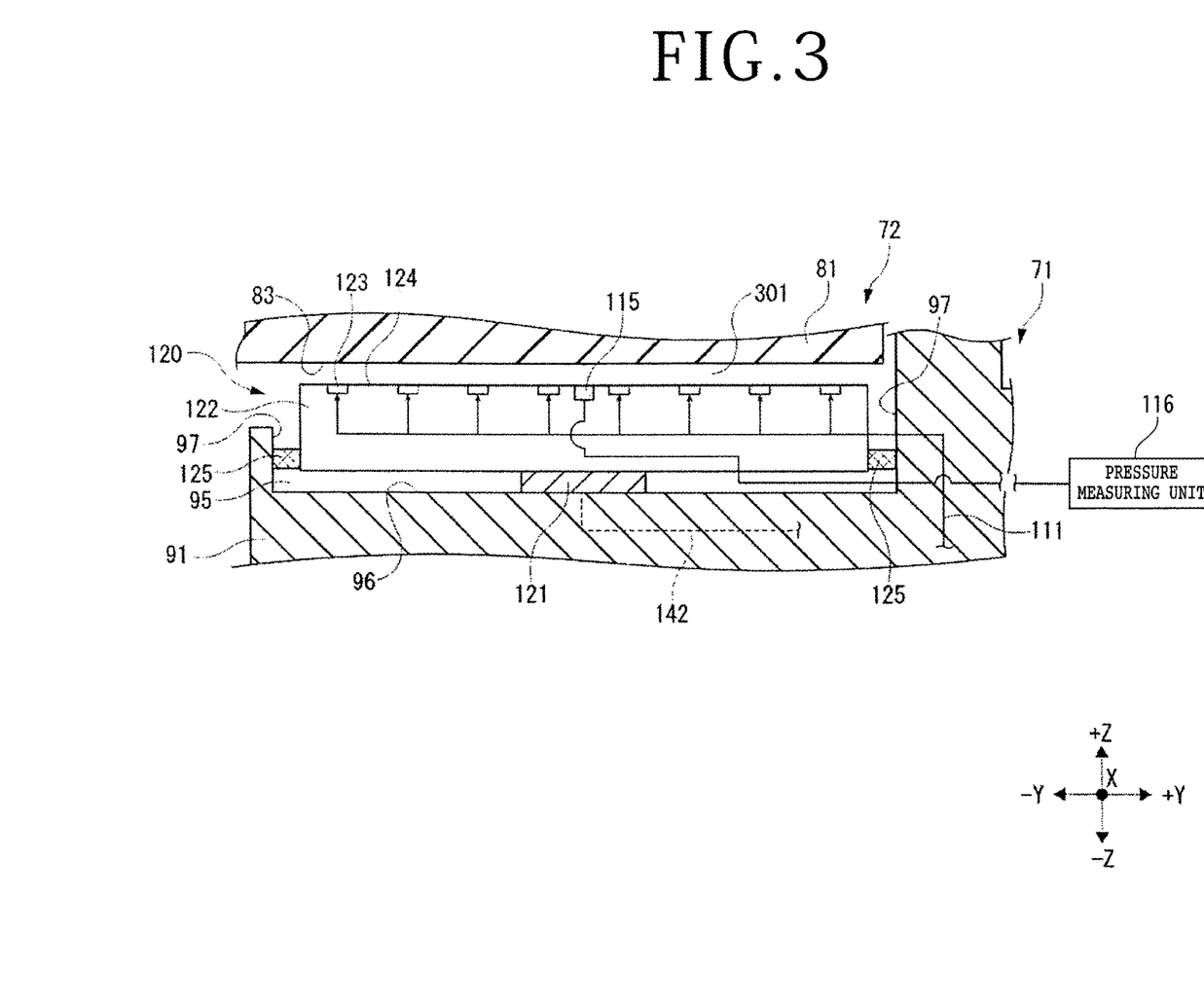
FIG. 3 is a view illustrating a configuration of an adjusting unit.

FIG. 3 depicts a configuration of an adjusting unit 120 opposed to the first disk portion 81. As illustrated in FIG. 3, the adjusting unit 120 includes a piezoelectric actuator 121 fixed to a bottom surface 96 of the thrust recessed portion 95, a movable portion 122 movable in a thrust direction (axial direction of the spindle 72), and a seal material 125 disposed between the movable portion 122 and side surfaces 97 of the thrust recessed portion 95.

The movable portion 122 is provided on the surface of the piezoelectric actuator 121. The movable portion 122 has a movable portion surface 124 opposed to the first disk portion 81. The movable portion surface 124 is an example of the inner surface of the spindle housing 71, and is orthogonal to the axial direction of the spindle 72 (Z-axis direction).

A disk portion surface 83 as a surface of the first disk portion 81 (second disk portion 82) is opposed to the movable portion surface 124. The disk portion surface 83 is an example of the outer surface of the spindle 72, and is orthogonal to the axial direction of the spindle 72.

The movable portion 122 has, in the movable portion surface 124, a plurality of thrust side air jetting ports 123 connected to the air supply passage 111. The thrust side air jetting ports 123 are an example of air supply portions. That is, the thrust side air jetting ports 123 are opened to a thrust gap 301 as a gap between the movable portion surface 124 of the spindle housing 71 and the disk portion surface 83 of the spindle 72, and supply air to the thrust gap 301.

That is, the thrust side air jetting ports 123 jet high-pressure air to the thrust gap 301 in the thrust direction. The thrust bearing that supports the spindle 72 by air in a rotatable and noncontact manner is thereby formed in the thrust gap 301 between the movable portion surface 124 of the spindle housing 71 and the disk portion surface 83 of the spindle 72.

Thus, the spindle housing 71 includes the thrust bearing and the radial bearing that support the spindle 72 by air in a rotatable and noncontact manner. In addition, the thrust bearing includes the thrust side air jetting ports 123 as air supply portions and the adjusting unit 120.

In addition, the movable portion 122 is provided so as to be movable along the thrust direction in the thrust recessed portion 95. The seal material 125 is used to seal the side surfaces of the movable portion 122 at a time of movement of the movable portion 122.

As illustrated in FIG. 2 and FIG. 3, a power line 142 is connected to the piezoelectric actuator 121. As illustrated in FIG. 1 and FIG. 2, the power line 142 is connected to a direct-current power supply 140 and a voltage control unit 141 for controlling the direct-current power supply 140. That is, the voltage control unit 141 is electrically connected to each piezoelectric actuator 121 via the power line 142. The voltage control unit 141 transmits direct-current power from the direct-current power supply 140 to the piezoelectric actuator 121 via the power line 142 while adjusting the voltage value of the direct-current power.

The piezoelectric actuator 121 expands or contracts in the thrust direction according to the voltage value of the direct-current power supplied from the voltage control unit 141. That is, by expanding or contracting in the thrust direction, the piezoelectric actuator 121 moves the movable portion 122 provided on the surface of the piezoelectric actuator 121, in the thrust direction. The movement of the movable portion 122 along the thrust direction varies the distance (width) of the thrust gap 301 in a direction perpendicular to the disk portion surface 83 of the spindle 72, that is, a distance between the movable portion surface 124 and the disk portion surface 83.

Thus, the piezoelectric actuator 121 is disposed in the spindle housing 71, and moves the movable portion surface 124 of the spindle housing 71 forming the thrust bearing, in the axial direction of the spindle 72.

In addition, as illustrated in FIG. 2 and FIG. 3, the movable portion 122 of the adjusting unit 120 includes a pressure element 115 in the movable portion surface 124 of the movable portion 122 which movable portion surface is opposed to the first disk portion 81 (second disk portion 82). The pressure element 115 is connected to a pressure measuring unit 116 outside the spindle unit 78.

The pressure element 115 generates an electric signal corresponding to the pressure of air in the thrust gap 301 between the movable portion surface 124 and the disk portion surface 83 of the spindle 72, and transmits the electric signal to the pressure measuring unit 116. On the basis of this electric signal, the pressure measuring unit 116 measures the pressure of the air in the thrust gap 301, that is, the pressure of the air in the thrust gap 301 in which the thrust bearing is formed.

In the present embodiment, the distance of the thrust gap 301 is adjusted at a time of grinding processing on the wafer 100. That is, the voltage control unit 141 adjusts the distance of the thrust gap 301 by using the piezoelectric actuator 121 corresponding to each pressure measuring unit 116 such that a pressure value of the pressure of the air in the thrust gap 301 which pressure is measured by each pressure measuring unit 116 becomes a pressure value set in advance. For this purpose, the voltage control unit 141 controls the voltage of the direct-current power supplied to each piezoelectric actuator 121. Incidentally, the pressure of the air in the thrust gap 301 substantially corresponds to the distance of the thrust gap 301.

For example, the grinding apparatus 1 is in an idle state until the temperature of the spindle 72 is stabilized after rotation of the spindle 72, and ends the idle state and starts processing after the temperature of the spindle 72 is stabilized.

Hence, in the present embodiment, the pressure of the air in the thrust gap 301 which pressure is set in advance is a small value during an idle time that is before the processing is performed in a process in which the temperature of the spindle 72 becomes stable, and is a large value after the temperature of the spindle 72 is stabilized.

In this case, the voltage control unit 141 increases the distance of the thrust gap 301 during the idle time. Consequently, the pressure of the air which pressure is measured by the pressure measuring unit 116 becomes a relatively small pressure value set in advance.

Incidentally, a set value in which a predetermined pressure value is set in advance may be provided, and the distance of the thrust gap 301 may be adjusted such that the pressure of the air which pressure is measured by the pressure measuring unit 116 at an idle start time becomes the set value.

In addition, after the temperature of the spindle 72 is stabilized (when the idle state is ended), the voltage control unit 141 controls the voltage of the direct-current power supplied to the piezoelectric actuator 121 such that the distance of the thrust gap 301 is decreased. Consequently, the pressure of the air which pressure is measured by the pressure measuring unit 116 becomes a relatively large pressure value set in advance. The grinding apparatus 1 thereafter starts grinding processing on the wafer 100.

In addition, for example, the pressure value of the thrust gap 301 which pressure value is set in advance is constant during the grinding processing. Hence, the voltage control unit 141 controls the voltage of the direct-current power supplied to the piezoelectric actuator 121, such that the distance of the thrust gap 301 is constant during the grinding processing. Thus, the pressure of the air during the grinding processing which pressure is measured by the pressure measuring unit 116 is a constant pressure value set in advance.

Incidentally, the voltage control unit 141 uniformizes the distance of the thrust gap 301 of the thrust bearing formed on the upper surface of the annular portion 91 of the spindle housing 71 and the distance of the thrust gap 301 of the thrust bearing formed on the lower surface of the annular portion 91 of the spindle housing 71 by controlling the voltage of the direct-current power supplied to each piezoelectric actuator 121.

As described above, in the present embodiment, by control of the voltage control unit 141, the piezoelectric actuator 121 of the adjusting unit 120 expands and contracts, and the distance of the thrust gap 301 can thereby be adjusted. Hence, during the idle time before the temperature of the spindle 72 is stabilized, for example, the thrust gap 301 can be widened. The present embodiment can thus suppress the occurrence of a situation in which the spindle 72 thermally deformed and the spindle housing 71 come into contact with each other during the idle time. Hence, in the present embodiment, the spindle 72 can be rotated continuously.

In addition, in the present embodiment, during the idle time, the spindle 72 can be rotated smoothly by widening of the thrust gap 301. Hence, it is also possible to shorten the length of time of the idle state.

In addition, in the present embodiment, the piezoelectric actuator 121 is expanded or contracted by control of the voltage control unit 141. Thus, at a time of the grinding processing, the thrust gap 301 can be narrowed to have a normal distance. A high-rigidity thrust bearing can thus be formed in the spindle unit 78.

Incidentally, in the foregoing embodiment, the adjusting unit 120 that can adjust the distance of the thrust gap 301 is provided in the thrust recessed portion 95 of the spindle housing 71. In regard to this, the adjusting unit that can adjust the distance of the thrust gap 301 may be provided in the spindle 72.

Figure 4:
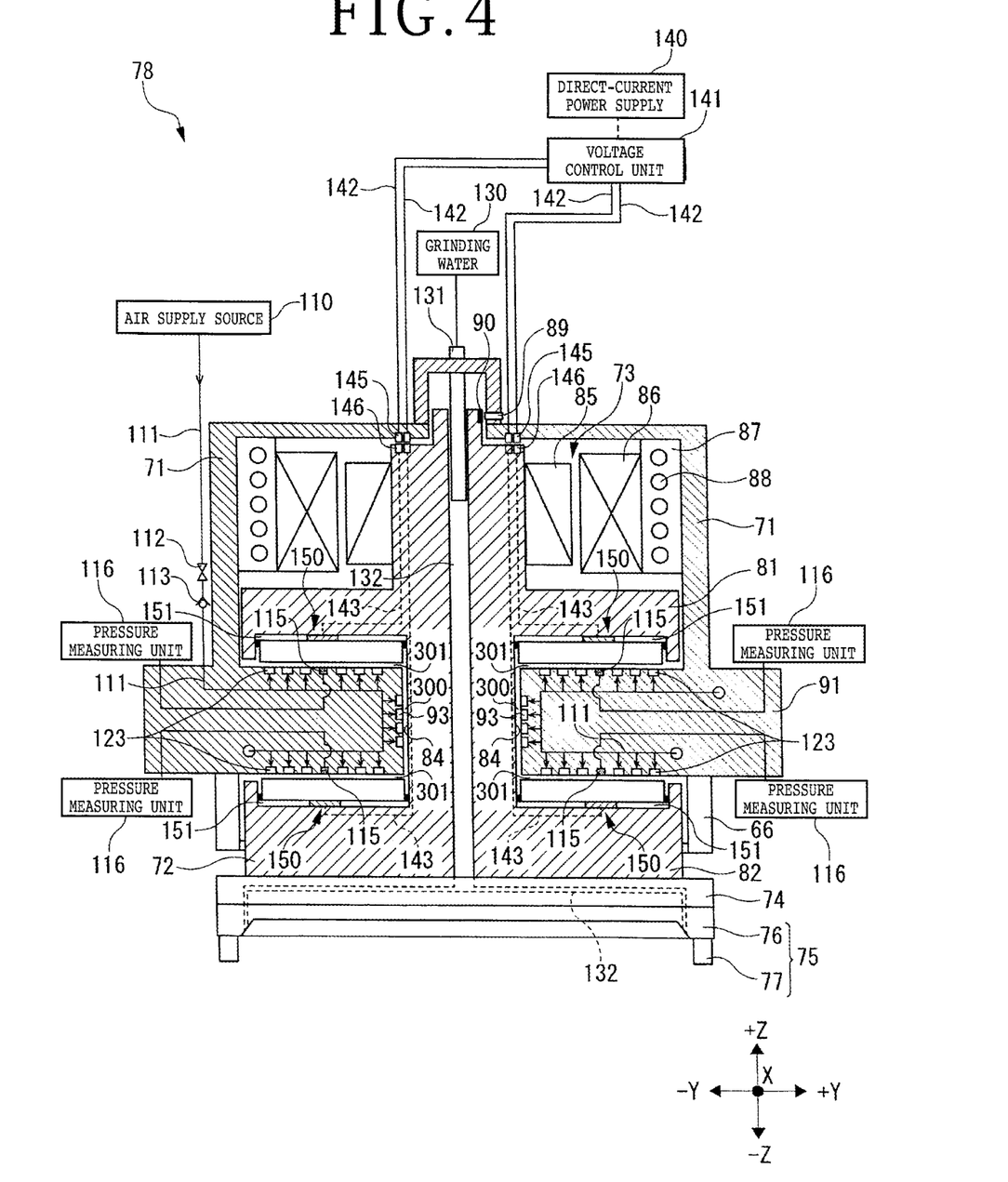
FIG. 4 is a view illustrating another configuration of the spindle unit.

That is, the spindle unit 78 may have such a configuration as illustrated in FIG. 4. The spindle unit 78 illustrated in FIG. 4 has a configuration including adjusting units 150 provided in the first disk portion 81 and the second disk portion 82 of the spindle 72 in place of the adjusting units 120 provided in the annular portion 91 of the spindle housing 71 in the configuration illustrated in FIG. 2.

As illustrated in FIG. 4, also in this configuration, radial side air jetting ports 93 are opened to a radial gap 300 as a gap between the radial side surface 84 of the spindle 72 and the annular portion 91 of the spindle housing 71. Hence, a radial bearing that supports the spindle 72 by air in a rotatable and noncontact manner is formed in the radial gap 300.

In addition, the spindle 72 includes a plurality of adjusting units 150 constituting a thrust bearing.

The adjusting units 150 are provided in thrust recessed portions 151 of the spindle 72. The thrust recessed portions 151 and the adjusting units 150 are formed in the first disk portion 81 and the second disk portion 82 of the spindle 72 so as to be opposed to the annular portion 91 of the spindle housing 71.

Figure 5:
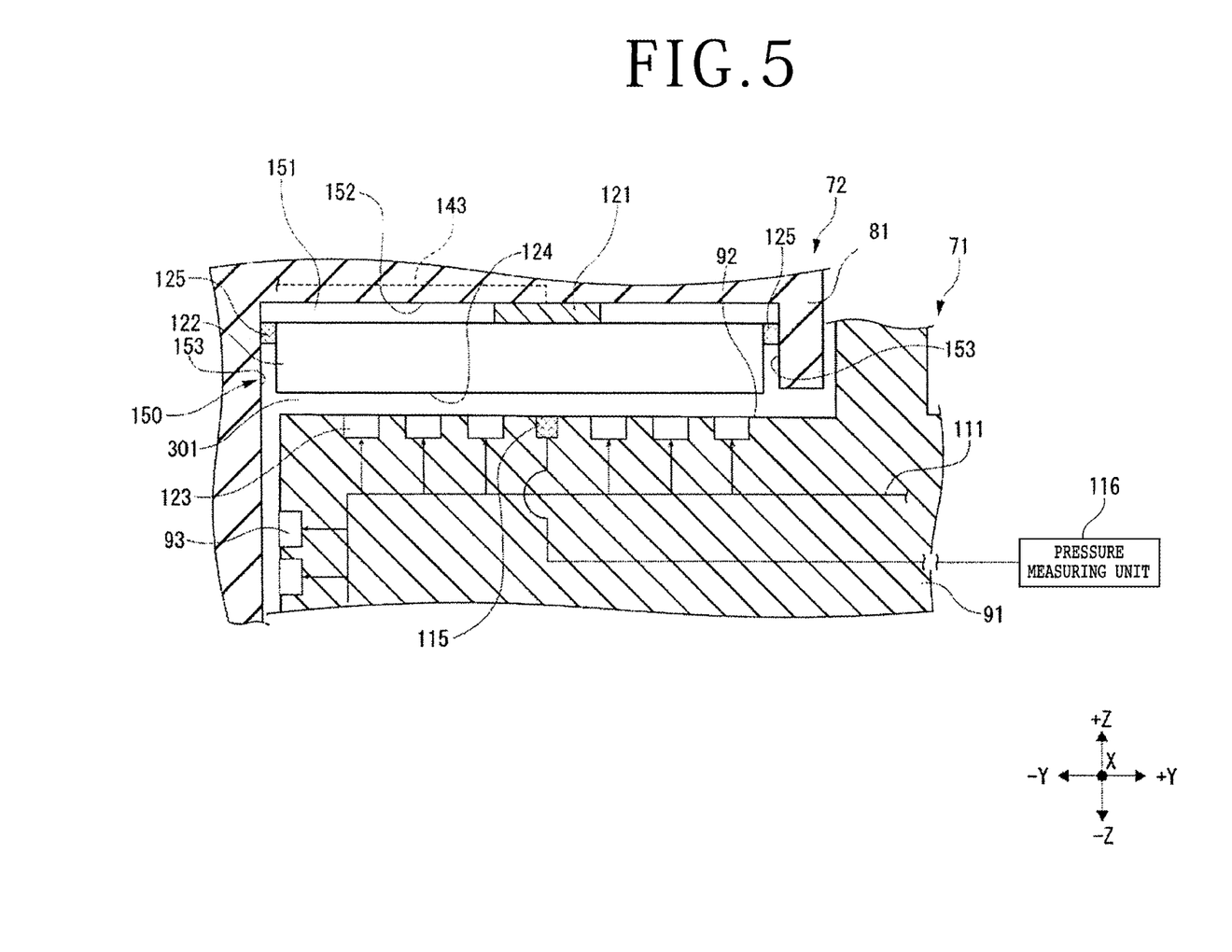
FIG. 5 is a view illustrating another configuration of the adjusting unit.

FIG. 5 depicts a configuration of an adjusting unit 150 formed in the first disk portion 81. As illustrated in FIG. 5, the adjusting unit 150 includes a piezoelectric actuator 121 fixed to a bottom surface 152 of the thrust recessed portion 151, a movable portion 122 movable in the thrust direction (Z-axis direction), and a seal material 125 disposed between the movable portion 122 and side surfaces 153 of the thrust recessed portion 151.

The movable portion 122 is provided on the surface of the piezoelectric actuator 121. The movable portion 122 has a movable portion surface 124 opposed to the annular portion 91. The movable portion surface 124 is an example of the outer surface of the spindle 72, and is orthogonal to the axial direction of the spindle 72.

An annular portion surface 92 as a surface of the annular portion 91 is opposed to the movable portion surface 124. The annular portion surface 92 is an example of the inner surface of the spindle housing 71, and is orthogonal to the axial direction of the spindle 72.

The annular portion 91 has, in the annular portion surface 92, a plurality of thrust side air jetting ports 123 connected to an air supply passage 111. Each thrust side air jetting port 123 is an example of an air supply portion. Each thrust side air jetting port 123 supplies air to a thrust gap 301 as a gap between the movable portion surface 124 of the spindle 72 and the annular portion surface 92 of the spindle housing 71. A thrust bearing that supports the spindle 72 by air in a rotatable and noncontact manner is thereby formed in the thrust gap 301 between the movable portion surface 124 and the annular portion surface 92.

The movable portion 122 is provided so as to be movable along the thrust direction in the thrust recessed portion 151. The seal material 125 seals the side surfaces of the movable portion 122 at a time of movement of the movable portion 122.

As illustrated in FIG. 4 and FIG. 5, a power line 143 is connected to the piezoelectric actuator 121. The power line 143 is connected to a direct-current power supply 140 and a voltage control unit 141 via a first contact 146 provided in the spindle 72, a second contact 145 provided in the spindle housing 71 and electrically connected to the first contact 146, and a power line 142 connected to the second contact 145.

Thus, as in the configuration illustrated in FIG. 2, the voltage control unit 141 is electrically connected to each piezoelectric actuator 121. The voltage control unit 141 transmits direct-current power from the direct-current power supply 140 to the piezoelectric actuator 121 while adjusting the voltage value of the direct-current power.

Incidentally, a contact structure between the first contact 146 and the second contact 145 may, for example, be similar to a contact structure of a direct-current motor.

The piezoelectric actuator 121 expands or contracts in the thrust direction according to the voltage value of the direct-current power supplied from the voltage control unit 141. The piezoelectric actuator 121 thereby moves the movable portion 122 provided on the surface of the piezoelectric actuator 121, in the thrust direction. The movement of the movable portion 122 along the thrust direction varies the distance of the thrust gap 301 in a direction perpendicular to the movable portion surface 124 of the spindle 72, that is, a distance between the movable portion surface 124 and the annular portion surface 92.

Thus, in the configuration illustrated in FIG. 4 and FIG. 5, the piezoelectric actuator 121 is disposed in the spindle 72, and moves the movable portion surface 124 of the spindle 72 forming the thrust bearing, in the axial direction of the spindle 72.

In addition, in the configuration illustrated in FIG. 4 and FIG. 5, a pressure element 115 that generates an electric signal according to the pressure of air in the thrust gap 301 is provided in the annular portion surface 92 of the annular portion 91 of the spindle housing 71. On the basis of this electric signal, a pressure measuring unit 116 measures the pressure of the air in the thrust gap 301 in which the thrust bearing is formed.

Thus, the spindle unit 78 having the configuration illustrated in FIG. 4 and FIG. 5 can also adjust the distance of the thrust gap 301 at a time of grinding processing on the wafer 100. That is, as in the configuration illustrated in FIG. 2 and FIG. 3, the voltage control unit 141 can adjust the distance of the thrust gap 301 by using the piezoelectric actuator 121 corresponding to each pressure measuring unit 116 such that the pressure of the air in the thrust gap 301 which pressure is measured by each pressure measuring unit 116 becomes a pressure value set in advance.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A spindle unit comprising:
   a spindle having a processing tool fitted to a distal end of the spindle; and
   a spindle housing having a thrust bearing and a radial bearing configured to support the spindle by air in a rotatable and noncontact manner;
   the thrust bearing including
      an air supply portion configured to supply air to a gap between an outer surface of the spindle, the outer surface being in a direction orthogonal to an axial direction of the spindle, and an inner surface of the spindle housing, and
      an adjusting unit including an actuator for adjusting a distance of the gap in a direction perpendicular to the outer surface of the spindle, the actuator configured to adjust an air pressure of the thrust bearing within the gap.

2. The spindle unit according to claim 1, wherein the actuator comprises a piezoelectric actuator disposed in the spindle and configured to move the outer surface of the spindle forming the thrust bearing, in the axial direction of the spindle.

3. The spindle unit according to claim 1, wherein the actuator comprises a piezoelectric actuator disposed in the spindle housing and configured to move the inner surface of the spindle housing forming the thrust bearing, in the axial direction of the spindle.

4. The spindle unit according to claim 1, wherein the thrust bearing is interposed between a first disk portion of the spindle and a second disk portion of the spindle.

5. The spindle unit according to claim 1, wherein the actuator is disposed in a thrust recessed portion of the spindle housing.

6. The spindle unit according to claim 5, wherein a seal is disposed between a side surface of the thrust recessed portion of the spindle housing and a movable portion of the thrust bearing.

7. A processing apparatus for processing a workpiece by a processing tool, the processing apparatus comprising:
- a spindle unit including a spindle having the processing tool fitted to a distal end of the spindle and a spindle housing having a thrust bearing and a radial bearing configured to support the spindle by air in a rotatable and noncontact manner;
- a holding unit configured to hold the workpiece;
- a pressure measuring unit configured to measure pressure of air; and
- a voltage control unit configured to control a voltage of direct-current power,
- the thrust bearing including
  - an air supply portion configured to supply air to a gap between an outer surface of the spindle, the outer surface being in a direction orthogonal to an axial direction of the spindle, and an inner surface of the spindle housing, and
  - an adjusting unit including an actuator capable of adjusting a distance of the gap in a direction perpendicular to the outer surface of the spindle, the actuator configured to adjust an air pressure of the thrust bearing within the gap;
- the pressure measuring unit measuring the air pressure within the gap;
- the voltage control unit controlling the voltage of the direct-current power supplied to the piezoelectric actuator, to adjust the distance of the gap such that a pressure value measured by the pressure measuring unit becomes a value set in advance.

8. The processing apparatus according to claim 7, wherein the actuator comprises a piezoelectric actuator disposed in the spindle and configured to move the outer surface of the spindle forming the thrust bearing, in the axial direction of the spindle.

9. The processing apparatus according to claim 7, wherein the actuator comprises a piezoelectric actuator disposed in the spindle housing and configured to move the inner surface of the spindle housing forming the thrust bearing, in the axial direction of the spindle.

10. The spindle unit according to claim 7, wherein the thrust bearing is interposed between a first disk portion of the spindle and a second disk portion of the spindle.

11. The spindle unit according to claim 7, wherein the actuator is disposed in a thrust recessed portion of the spindle housing.

12. The spindle unit according to claim 11, wherein a seal is disposed between a side surface of the thrust recessed portion of the spindle housing and a movable portion of the thrust bearing.

* * * * *